United States Patent [19]
McConnell

[11] Patent Number: 6,064,122
[45] Date of Patent: May 16, 2000

[54] MICROTURBINE POWER OF GENERATING SYSTEM INCLUDING A BATTERY SOURCE FOR SUPPLYING STARTUP POWER

[75] Inventor: Bob McConnell, San Pedro, Calif.

[73] Assignee: AlliedSignal Power Systems Inc., Albuquerque, N.Mex.

[21] Appl. No.: 09/186,953

[22] Filed: Nov. 5, 1998

[51] Int. Cl.[7] .................................................. F02G 5/00
[52] U.S. Cl. ................................. 290/32; 290/52; 60/608
[58] Field of Search ............................. 290/31, 32, 36 R, 290/52; 60/607, 608

[56] References Cited

U.S. PATENT DOCUMENTS

| | | | |
|---|---|---|---|
| 4,694,654 | 9/1987 | Kawamura | 60/605 |
| 4,745,755 | 5/1988 | Kawamura | 60/608 |
| 4,754,607 | 7/1988 | Mackay | 60/723 |
| 4,757,686 | 7/1988 | Kawamura et al. | 60/608 |
| 4,886,978 | 12/1989 | Kawamura | 290/52 |
| 4,955,199 | 9/1990 | Kawamura | 60/608 |
| 5,088,286 | 2/1992 | Muraji | 60/608 |
| 5,323,613 | 6/1994 | Akiyama | 60/608 |
| 5,903,116 | 5/1999 | Geis | 318/140 |

FOREIGN PATENT DOCUMENTS

0472294 A1  7/1991  European Pat. Off. .

*Primary Examiner*—Nicholas Ponomarenko
*Attorney, Agent, or Firm*—Ephraim Starr

[57] ABSTRACT

A microturbine power generating system includes a battery source for providing startup power. Dc power provided by the battery source is converted to three-phase ac power, and the three-phase ac power is supplied to stator windings of an electrical generator of the system. The three-phase ac power causes the electrical generator to operate as a starter motor. An up chopper may be used to reduce the required voltage of the battery source. A down chopper may be used to charge the battery source during normal operation of the microturbine power generating system. The down chopper can allow the battery source to supply backup power in the event the electrical generator experiences a failure.

14 Claims, 4 Drawing Sheets

MICROTURBINE POWER OF GENERATING SYSTEM INCLUDING A BATTERY SOURCE FOR SUPPLYING STARTUP POWER

BACKGROUND OF THE INVENTION

The present invention relates generally to microturbine power generating systems. More specifically, the present invention relates to a microturbine power generating system including a battery source for providing startup power.

The United States Electric Power Research Institute (EPRI), which is the uniform research facility for domestic electric utilities, predicts that up to 40% of all new electrical power generation could be provided by distributed generators by the year 2006. In many parts of the world lacking an electric infrastructure (e.g., transmission and distribution lines), the commercialization of distributed generators will be greatly expedited since central plants will not only cost more per kilowatt, but will also need expensive infrastructure installed to deliver power to consumers of electricity. In the United States and other countries already having the electric infrastructure, the small, multi-fuel, modular distributed microturbine generation units will allow consumers of electricity to choose the correct method of electric service. The small, multi-fuel, modular distributed microturbine generation units will also allow consumers of electricity to choose the most cost-effective electric service.

Small, multi-fuel, modular distributed microturbine generation units could help alleviate current afternoon "brownouts" and "blackouts" that are prevalent in many parts of the world. A simple, single moving part concept would allow for low technical skill maintenance. Low overall cost would allow for wide spread purchase in those parts of the world where capital is sparse.

For an example of a microturbine power generating system, see U.S. Pat. No. 4,754,607, which is assigned to the assignee of the present invention. The microturbine power generating system includes a turbine, a compressor and an electrical generator, with each device including a rotating component (e.g., a turbine wheel, a compressor wheel and a permanent magnet rotor).

Starting up the microturbine power generating system can be problematic. A separate starter motor could be used to turn the compressor until the microturbine power generating system is capable of sustaining combustion. In the alternative, the electrical generator could be used to turn the compressor during startup, as disclosed in the assignee's co-pending patent application U.S. Ser. No. 08/995,462 filed on Dec. 19, 1997. A switch/starter control is included to supply an excitation current to stator windings of the electrical generator, which turns the compressor until combustion can be sustained.

Using either approach, an external source of power is needed to operate the starter motor or to supply an excitation current to the stator windings of the electrical generator. U.S. Ser. No. 08/995,462 also discloses a battery for providing power to the switch/starter control. The battery is sized to the requirements of the system.

However, such a battery tends to have a high voltage. High-voltage batteries are difficult and potentially dangerous to handle. Large, high-voltage batteries are also uncommon and, therefore, are difficult to procure in large quantities. This would create problems for mass production of the microturbine power generating systems.

SUMMARY OF THE INVENTION

The invention may be regarded as a microturbine power generating system including a compressor, a turbine for converting gaseous heat energy into mechanical energy, and an electrical generator for converting the mechanical energy produced by the turbine into electrical energy. The electrical generator includes a rotor and a stator. The rotor is mechanically coupled to wheels of the turbine and the compressor. The microturbine power generating system further includes a battery source for providing dc power, and a startup circuit including an inverter for converting the dc power to ac power. The ac power is supplied to the stator during startup of the system. The ac power causes the electrical generator to turn the turbine and compressor wheels during startup.

According to different aspects of the invention, the battery source is a high-voltage battery source or, alternatively, a low-voltage battery source. The required voltage of the battery source is be reduced by the use of the up chopper, or, alternatively, by connecting the inverter to taps on the windings of the stator. Reducing the required voltage of the battery source allows commonly available batteries to be used. The commonly available, low-voltage batteries are typically easier and safer to handle, and they are easier to procure than high-voltage batteries. Controlling the recharge rate as a function of temperature can reduce temperature-related problems.

According to yet another aspect of the invention, the startup circuit includes a down chopper for recharging the battery source during normal operation of the microturbine power generating system. This allows the battery source to be recharged conveniently.

DETAILED DESCRIPTION OF THE INVENTION

Figure 1:
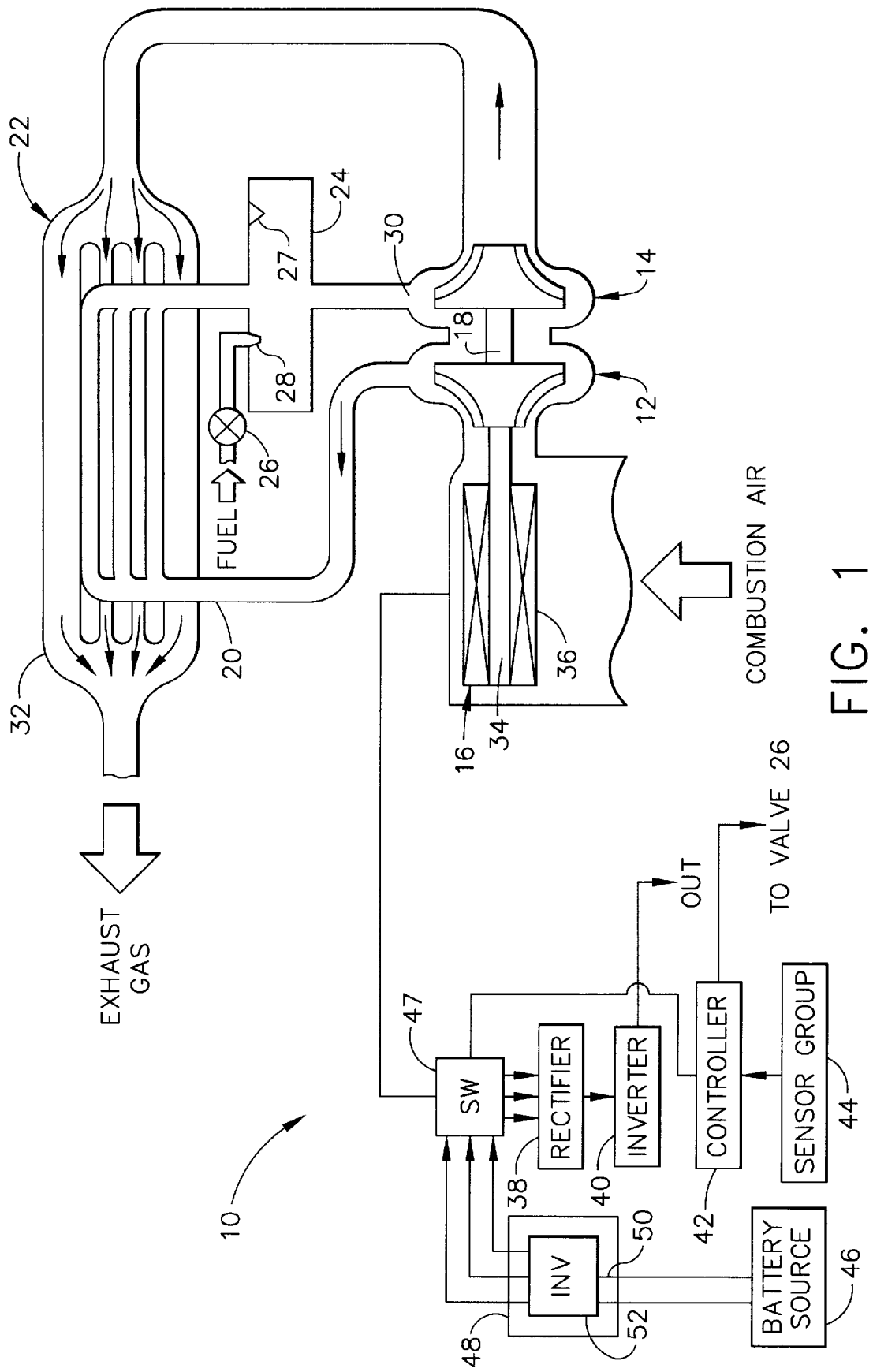
FIG. 1 is a block diagram of a microturbine power generating system according to the present invention, the system including a battery source and a startup control.

FIG. 1 shows a microturbine power generating system 10 including a compressor 12, a turbine 14 and an integrated electrical generator 16. For the embodiment shown in the drawings, the electrical generator 16 is cantilevered from the compressor 12. The compressor 12, the turbine 14 and the electrical generator 16 are normally rotated by a single common shaft 18. Although the compressor 12, turbine 14 and electrical generator 16 may be mounted to separate shafts, the use of the single common shaft 18 adds to the compactness and reliability of the microturbine power generating system 10.

The shaft 18 may be supported by self-pressurized air bearings such as foil bearings. The foil bearings eliminate the need for a separate bearing lubrication system and reduce the occurrence of maintenance servicing. The foil bearings also reduce vibration, which reduces system maintenance.

Air entering an inlet of the compressor 12 is compressed. Compressed air leaving an outlet of the compressor 12 is circulated through cold side air passages 20 in a recuperator 22. Inside the recuperator 22, the compressed air absorbs heat from the turbine exhaust waste heat. The heated, compressed air leaving the cold side of the recuperator 22 is supplied to a combustor 24. Using the recuperator 22 to heat the compressed air reduces fuel consumption.

Fuel is also supplied to the combustor 24. Either gaseous or liquid fuel may be used. In gaseous fuel mode, any suitable gaseous fuel can be used. Choices of fuel include diesel, flair gas, off gas, gasoline, naphtha, propane, JP-8, methane, natural gas and other man-made gases.

The flow of fuel to the combustor 24 is controlled by a flow control valve 26. The fuel is injected into the combustor 24 by an injection nozzle 28.

Inside the combustor 24 the fuel and compressed air are mixed and ignited by an igniter 27 in an exothermic reaction. Hot, expanding gases resulting from combustion in the combustor 24 are directed to an inlet nozzle 30 of the turbine 14. The hot, expanding gases resulting from the combustion are expanded through the turbine 14, thereby creating turbine power. The turbine power, in turn, drives the compressor 12 and the electrical generator 16.

Turbine exhaust gas is circulated by hot side exhaust passages 32 in the recuperator 22. Inside the recuperator 22, heat from the turbine exhaust gas is transferred to the compressed air in the cold side air passages 20. In this manner, some heat of combustion is recuperated and used to raise the temperature of the compressed air prior to combustion. After surrendering part of its heat, the exhaust gas exits the recuperator 22.

In a preferred embodiment, the generator 16 is a ring-wound, two-pole toothless (TPTL) brushless permanent magnet machine having permanent magnet rotor 34 and stator windings 36. The rotor 34 is attached to the shaft 18. When the rotor 34 is rotated by turbine power generated by the rotating turbine 14, an alternating current is induced in the stator windings 36. Speed of the turbine 34 can be varied in accordance with external energy demands placed on the microturbine power generating system 10. Variations in the turbine speed will produce a variation in the frequency of the alternating current generated by the electrical generator 16.

The ac power is rectified to dc power by a rectifier 38, and the dc power is converted to fixed frequency ac power by a solid-state electronic inverter 40 (hereinafter the "main" inverter 40). Use of the rectifier 38 and the main inverter 40 allows for wide flexibility in determining the electric utility service to be provided by the power generating system of the present invention. Because any inverter can be selected, frequency of the ac power can be selected by the consumer. In embodiments providing for direct use of ac power at wild frequencies, the rectifier 38 and main inverter 40 are eliminated.

A controller 42 controls the turbine speed by controlling the amount of fuel flowing to the combustor 24. The controller 42 uses sensor signals generated by a sensor group 44 to determine the external demands upon the microturbine power generating system 10 and then controls the fuel valve 26 accordingly. The sensor group 44 includes one or more sensors such as turbine speed sensors and various temperature and pressure sensors for measuring operating temperatures and pressures in the microturbine power generating system 10.

A battery source 46 and a startup control 48 are included for starting up the microturbine power generating system 10. The startup control 48 includes a dc link 50 and a solid state inverter 52 (hereinafter the "second" inverter 52). The battery source 46 supplies dc power at a high voltage to the dc link 50. The phrase "battery source," as used herein, means one or more cells or any other suitable means of supplying electric current. If a group of two or more cells are used, they are electrically connected. Other means of supplying electric current include, for example, capacitors or ultra capacitors and other energy storage devices.

During startup, the controller 42 commands transistors of the second inverter 52 to switch on and off and thereby convert the dc power on the dc link 50 to the three-phase ac power. The three-phase ac power, which is supplied to the stator windings 36 of the electrical generator 16, causes the electrical generator 16 to operate as a starter motor.

By controlling the modulation frequency of the transistors in the second inverter 52, the controller 42 can vary the frequency of the ac power supplied to the stator windings 36. The frequency of the ac power starts at a low frequency such as 2 Hz, and it is then ramped up (i.e., increased). Ramping up the frequency of the ac power causes the turbine speed to ramp up.

While the electrical generator 16 is being operated as a starter motor, the controller 42 is monitoring one or more parameters that indicate whether the system 10 can sustain combustion. For example, the controller 42 might monitor turbine speed. Once the controller 42 determines that the microturbine power generating system 10 can sustain combustion (e.g., the turbine speed reaches a threshold), the controller 42 stops the inverter 40 from supplying the ac power to the stator windings 36 and turns on the fuel and the igniter 27. Once the electrical generator 16 is capable of generating electrical power, the controller 42 enables the rectifier 38 and main inverter 40 to convert the output of the electrical generator 16 to a fixed frequency ac power. The rectifier 38 and main inverter 40 are enabled, in the embodiment shown in the drawings, by connecting inputs of the rectifier 38 to terminals of the electrical generator 16 via a first switch 47. The first switch 47 is shown for illustrative purposes. In practice, the rectifier 38 and main inverter 40 may be enabled by other means.

The battery source 46 has a voltage that is capable of motoring the electrical generator 16. The actual voltage will depend in part upon the back emf generated by the electrical generator 16 during startup. As an exemplary embodiment, a high voltage battery such as a single sealed lead-acid battery having 192 two-volt cells in series to produce a nominal voltage of about 400 volts is used. Such a battery source 46 is available from Hawker Energy Products, located in Warrensburg, Mo.

Figure 2:
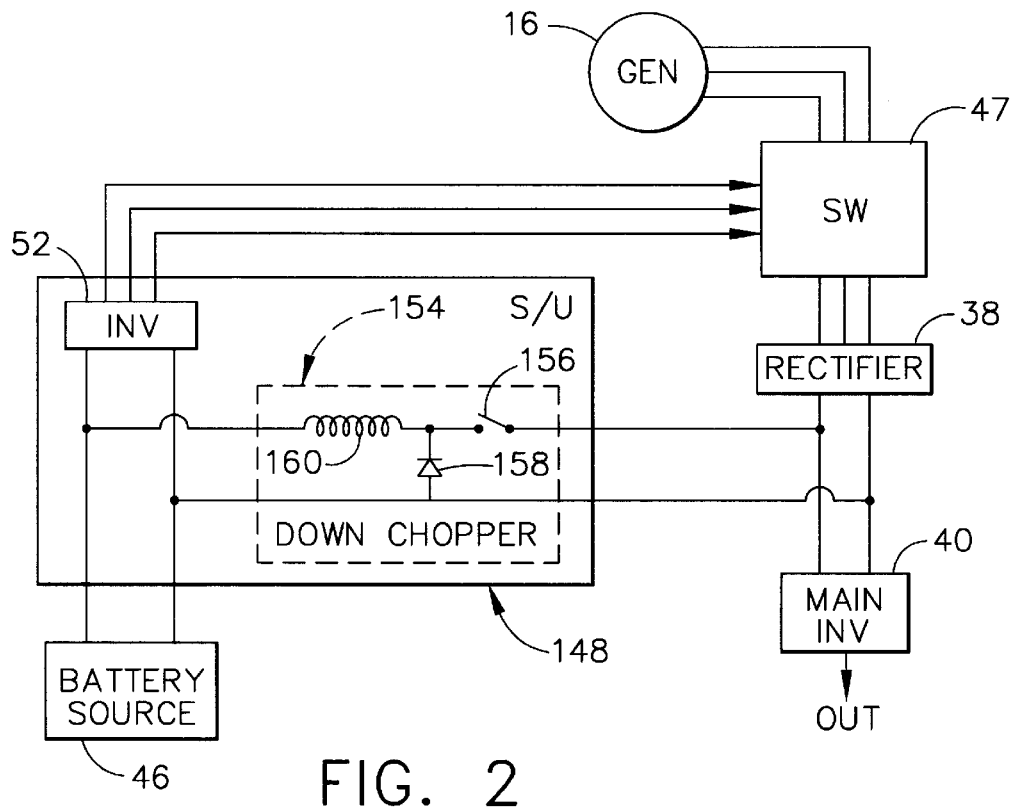
FIG. 2 is an illustration of an alternative startup control for the microturbine power generating system.

FIG. 2 shows an alternative startup control 148. The startup control 148 includes the dc link 50, the second inverter 52 and a down chopper 154. During normal operation of the microturbine power generating system 10, the down chopper 154 draws some of the current on an output of the rectifier 38 and uses that current to charge the battery source 46. The down chopper 154 includes a switch 156 that is controlled by the controller 42. Since the voltage on the output of the dc rectifier 38 will usually be higher than the battery voltage, the switch 156 in the down chopper 154 is pulse width modulated by the controller 42 so that the average voltage across the battery source 46 can properly charge the battery source 46. The down-chopper 154 also includes a diode 158 and an inductor 160. The inductor 160 serves as a current filter that limits the rate of current rise while the down chopper switch 156 is closed. The diode 158 provides a path for inductor current while the down chopper switch 156 is open. Thus, the down chopper 154 allows the high-voltage battery source 46 to be charged conveniently.

The down chopper switch 156 is modulated at a fixed duty cycle. For example, in a preferred embodiment, the down chopper switch 156 is modulated at a duty cycle of 80% to allow a 400 volt battery to be charged by a rectifier 38 that has an output voltage of 500 vdc. However, in alternative embodiments, a more elaborate scheme is used for controlling the charging rate of the battery source 46. For example, the battery source 46 is charged at a rate that is a function of parameters such as battery temperature, charging current and battery voltage. Signals indicating these parameters can be generated by the sensor group 44. While the battery source 46 is being charged, the controller 42 monitors these parameters to control the recharging rate. The controller 42 begins modulating the switch 156 at a fixed duty cycle. In the meantime, the controller 42 also monitors the charging current to ensure that the charging current does not exceed a threshold. If the charging current exceeds a threshold, the controller 42 reduces the duty cycle until the current falls below the threshold. While the battery source 46 is being recharged, the controller 42 also monitors the battery temperature and voltage. The controller 42 stops recharging the battery source 46 when the battery source 46, at a given temperature, reaches a certain battery voltage. The battery temperature may be measured inside the battery enclosure. The charging current may be measured by a current sensor attached to an upper conductor inside the battery source 46.

The down chopper 154 also allows the battery source 46 to supply dc power directly to the main inverter 40. If, for example, the electrical generator 16 experiences a failure and cannot generate electric power, the controller 42 closes the switch 156 and commands the main inverter 40 to modulate the battery power to produce a fixed frequency ac power. Thus, the down chopper 154 also allows the battery source 46 to provide a backup supply of power.

Figure 3:
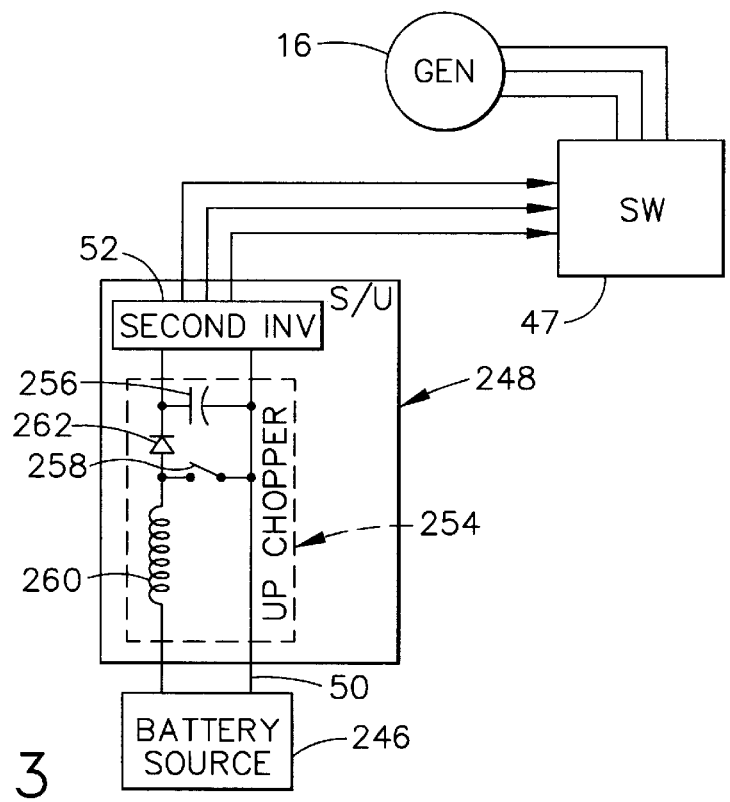
FIGS. 3 to 5 are illustrations of alternative battery sources and alternative startup controls for the microturbine power generating system.

FIG. 3 shows an alternative battery source 246 and another (third) startup control 248. Instead of providing a high voltage, the alternative battery source 246 provides a low voltage. The low voltage source 246 includes a single 48-volt battery or four 12-volt batteries connected in series. The 12-volt batteries, in an exemplary embodiment, are automotive batteries, which are commonly available as opposed to the large, high-voltage batteries.

The low voltage source 246 alone does not provide sufficient voltage to motor the electrical generator 16 during startup. However, the third startup control 248 includes an up-chopper 254, which boosts the voltage from the low voltage source 246 to a level that is capable of motoring the electrical generator 16. The up-chopper 254 boosts the voltage by a factor between five and fifteen. For example, the upper chopper 254 could boost the 48 volts from the low voltage source 246 to a voltage of 400 volts. The boosted voltage is converted to a three-phase ac power for motoring the electrical generator 16 during startup.

The up chopper 254 includes a capacitor 256, a switch 258, an inductor 260 and a diode 262. At the beginning of startup, the controller 42 pulse width modulates the up chopper switch 258, causing the up chopper switch 258 to open and close. When the up chopper switch 258 is closed, energy from the battery is stored in the up chopper inductor 260. When the up chopper switch 258 is opened, energy is transferred from the up chopper inductor 260 to the up chopper capacitor 256. The up chopper diode 262 prevents the capacitor 256 from being discharged while the up chopper switch 258 is closed.

The controller 42 controls the rate at which the up chopper capacitor 256 is charged. The up chopper switch 258 may be modulated at a duty cycle that allows the up chopper capacitor 256 to be charged quickly when the voltage across the up chopper capacitor 256 is low. The up chopper switch 258 may be modulated at a duty cycle that allows the capacitor 256 to be charged at a trickle rate when the voltage across the up chopper capacitor 256 is high. Trickle-charging the up chopper capacitor 256 allows for the components (e.g., the diode 262 and the inductor 260) to be sized economically. Reducing component size reduces cost and temperature-related problems such as thermal cooling and component inefficiencies.

Figure 4:
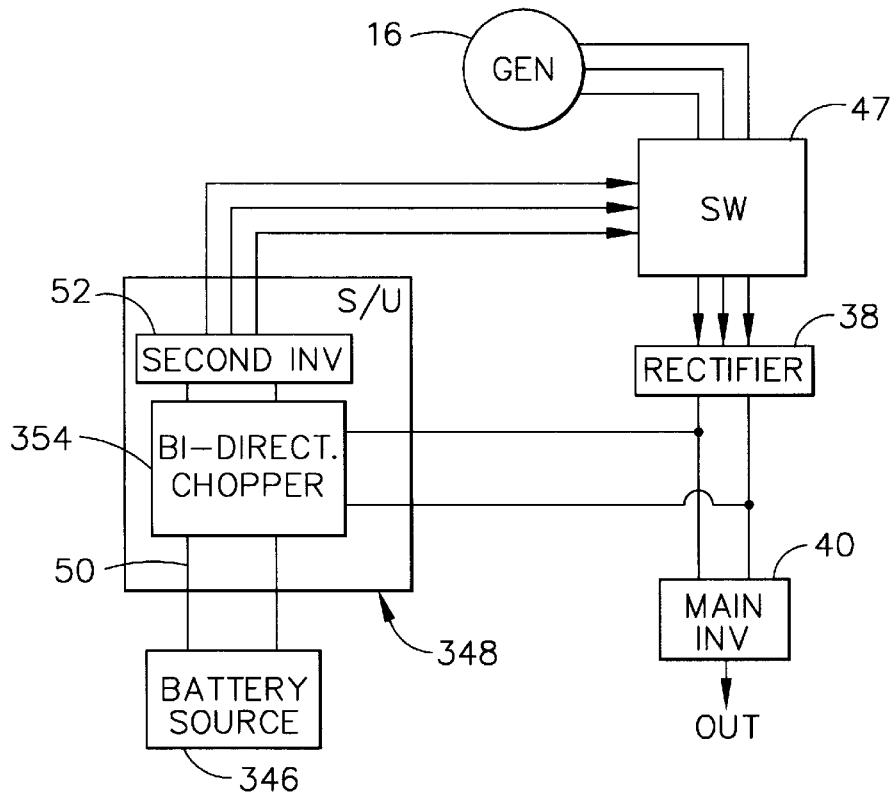

FIG. 4 shows a low voltage battery source 346 and a starter control 348 including a dc link 50, an inverter 52 and a bi-directional chopper 354. The bi-directional chopper 354 provides the functionality of both the up chopper 254 and the down chopper 154. Thus, the bi-directional chopper 354 boosts the voltage from the low voltage battery source 346 and applies the boosted voltage on the dc link 50. The second inverter 52 converts the power on the dc link 50 to three-phase ac power for startup. During normal operation of the microturbine power generating system 10, the bi-directional chopper 354 uses the rectifier output power to charge the low voltage battery source 346. A duty cycle of 10%, for example, would reduce a rectified voltage of 500 volts to about 50 volts for charging a 48 volt battery. In the event the electric generator 16 experiences a failure during normal operation, the bi-directional chopper 354 connects the battery source 346 to inputs of the main inverter 40 to provide backup power.

Figure 5:
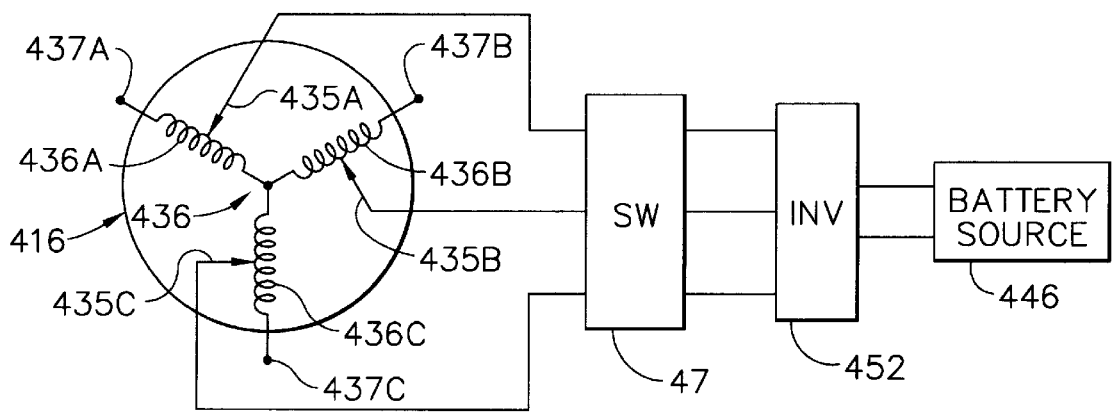

FIG. 5 shows another embodiment of the present invention. Taps 435A, 435B, 435C on windings 436A, 436B, 436C of the stator windings 436 are brought outside the electrical machine 416. The taps 435A, 435B, 435C allow an inverter 452 and low voltage battery source 446 to motor the electrical generator 416. The low voltage battery source 446 can be used because the back emf is lower at the taps 435A, 435B, 435C than at the terminals 437A, 437B, 437C of the electrical generator 416.

Figure 6:
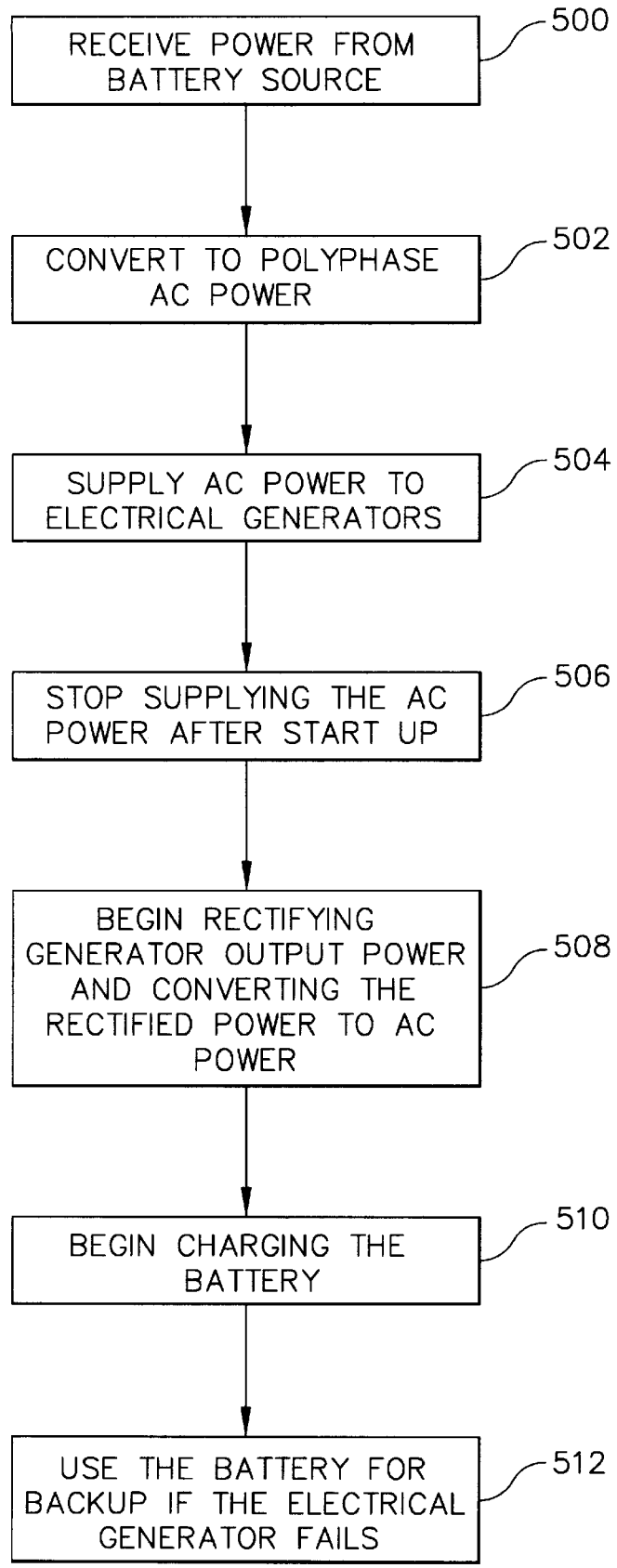
FIG. 6 is a flowchart of a method of starting the power generating system according to the present invention.

FIG. 6 shows a generalized method of using a battery in conjunction with a microturbine power generating system. During startup of the microturbine power generating system, dc power is received from the battery source (block 500). If a high voltage battery is used, the power is received directly from the battery. If a low voltage battery is used, the battery voltage is boosted, or, in the alternative, a stator winding of the electrical generator is tapped and the tapped voltage is provided.

The battery power is converted to polyphase ac power during startup of the microturbine power generating system (block 502), and the polyphase ac power is supplied to the stator windings of the electrical generator (block 504). The polyphase ac power causes the electrical generator to operate as a starter motor during the startup of the power generating system.

At about the same time the microturbine power generating system can sustain combustion, the supply of polyphase power to the stator windings is stopped (block 506). Once the electrical generator is capable of producing electric power, the output of the electrical generator may be rectified and modulated to produce a fixed frequency ac power (block 508). The fixed frequency ac power is placed on a power grid for consumer use, or used directly without the grid.

For the embodiment shown in the drawings, the rectified output of the electrical generator is also down chopped and used to charge the battery source (block 510). In the event the electrical generator fails, the battery power may be supplied to the main inverter, which modulates the battery power to provide fixed frequency backup power (block 512).

The backup power may be placed on a power grid for consumer use, or the backup power may be used directly without the grid.

Thus disclosed is a microturbine power generating system that includes a battery source for providing dc power and a startup circuit for converting the dc power to ac power. The battery source is, alternatively, a high-voltage battery or a low-voltage battery. The required battery source voltage may be reduced by the use of the up chopper. Pulse width modulating the up chopper as a function of temperature can reduce temperature-related problems. The required battery voltage is alternatively reduced by supplying power to taps on the stator windings of the electrical generator. Reducing the required battery source voltage allows commonly-available batteries to be used. The commonly-available, low-voltage batteries are typically easier and safer to handle and they are easier to procure than high-voltage batteries.

The battery source may be recharged during normal operation of the microturbine power generating system by using a down chopper. The down chopper allows the battery source to be recharged conveniently. The down chopper may also allow the battery source to supply backup output power if the electrical generator experiences a failure. The battery source may instead be used in combination with a bi-directional chopper, which provides the functionality of both the up chopper and the down chopper.

The invention having now been described in detail, those skilled in the art may recognize alternative embodiments that are not true departures from the present invention. Thus, the invention is not limited to the specific embodiments disclosed above, but is to be construed according to the scope and spirit of the claims that follow.

What is claimed is:

1. A microturbine power generating system comprising:
    a compressor including a compressor wheel;
    a turbine for converting gaseous heat energy into mechanical energy, the turbine including a turbine wheel;
    an electrical generator for converting the mechanical energy produced by the turbine into electrical energy, the electrical generator including a rotor and a stator, the rotor being mechanically coupled to the turbine wheel and the compressor wheel;
    a battery source for providing dc power; and
    a startup circuit including an inverter for converting the dc power to ac power, the inverter selectably connected to the stator;
    whereby the ac power causes the electrical generator to turn the turbine and compressor wheels during startup;
    wherein the startup circuit further includes an up chopper for boosting voltage of the battery source, an output of the up chopper providing the dc power to the inverter; and
    wherein the electrical generator provides ac power during normal operation of the microturbine power generating system, wherein the system further comprises a rectifier for rectifying the ac power generated by the electrical generator; and wherein the startup circuit further includes means for using the rectified power to charge the battery source during the normal operation of the microturbine power generating system.

2. The system of claim 1, wherein the battery source includes a single battery for providing the dc power to the startup circuit.

3. The system of claim 1, wherein the up chopper boosts the voltage of the battery source by a factor ranging between about five and fifteen.

4. The system of claim 1, wherein the up chopper includes a pulse-width modulatable energy storage unit for storing the dc power from the battery source, and wherein the system further comprises a controller for pulse width modulating the storage unit to boost the voltage.

5. The system of claim 1, wherein the recharging means includes a down chopper, responsive to the rectified power, for providing dc power at a reduced voltage to the battery source.

6. The system of claim 5, further comprising a controller for controlling the down chopper to recharge the battery source.

7. The system of claim 6, wherein the battery source is recharged as a function of battery source voltage, current and battery source temperature.

8. The system of claim 1, further comprising a second inverter for converting the rectified power to ac power, and wherein the recharging means further includes means for connecting the battery source to the second inverter when the electrical generator experiences a failure, whereby the dc power provided by the battery source is converted to ac power by the second inverter.

9. The system of claim 1, wherein the startup circuit includes a bi-directional chopper for charging the battery source during normal operation and for boosting dc voltage provided by the battery source during startup, an output of the bi-directional chopper providing the dc power to the inverter.

10. The system of claim 9, further comprising a controller for controlling the bi-directional chopper to boost the dc voltage.

11. The system of claim 1, wherein the inverter is connected to taps on windings of the stator.

12. A method of using a battery source in combination with a microturbine power generating system, the system including an electrical generator, the electrical generator including stator windings, the method comprising the steps of:
    receiving dc power from the battery source;
    converting the dc power from the battery source to polyphase ac power during startup of the microturbine power generating system;
    supplying the polyphase ac power to the stator windings of the electrical generator, wherein the polyphase ac power causes the electrical generator to operate as a starter motor during the startup of the power generating system;
    boosting the dc power received from the battery source, wherein the boosted battery power is converted to polyphase ac power;
    rectifying an output of the electrical generator during normal operation of the microturbine power generating system;
    down chopping at least some of the rectified power during normal operation of the microturbine power generating system; and
    using the down chopped power to charge the battery source.

13. The method of claim 12, further comprising the step of modulating the dc power from the battery source and supplying the modulated battery source power as backup power in the event the electrical generator experiences a failure during normal operation of the microturbine power generating system.

14. The method of claim 12, wherein the polyphase ac power is supplied to taps on the stator windings.

* * * * *